UNITED STATES PATENT OFFICE.

VENDEL LÁSZLLÓ BÉKEFI, OF CLEVELAND, OHIO.

ARMOR FOR RUBBER TIRES.

No. 891,030.  Specification of Letters Patent.  Patented June 16, 1908.

Application filed December 9, 1907. Serial No. 405,678.

*To all whom it may concern:*

Be it known that I, VENDEL LÁSZLLÓ BÉKEFI, a citizen of the United States, residing at Cleveland, in the county of Cuyahoga and State of Ohio, have invented certain new and useful Improvements in Armors for Rubber Tires, and do declare that the following is a full, clear, and exact description of the invention, which will enable others skilled in the art to which it appertains to make and use the same.

My invention relates to improvements in armors for rubber tires, and the invention consists in a construction of armor which is flexible and at the same time serves as a perfect protection against puncture, all substantially as shown and described and particularly pointed out in the claims.

Figure 1:
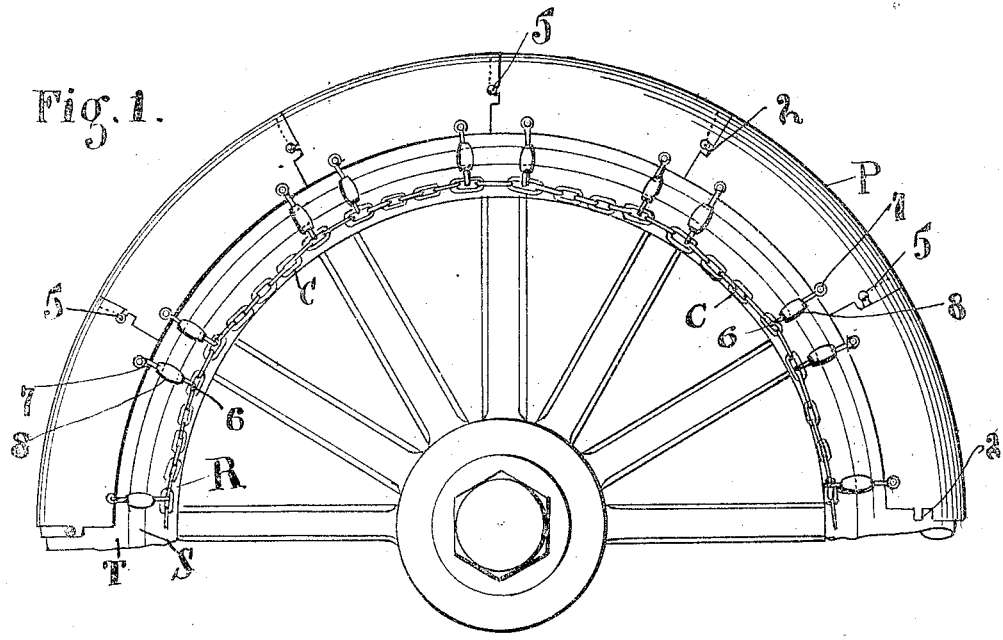
Figure 2:
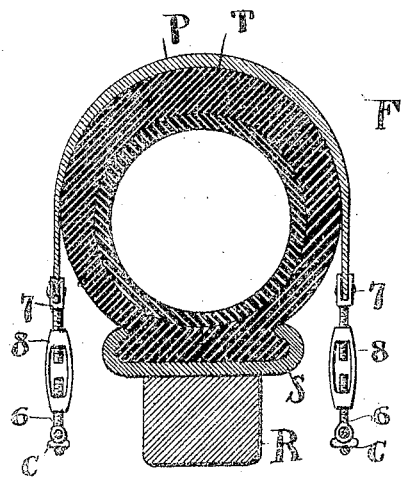
Figure 3:
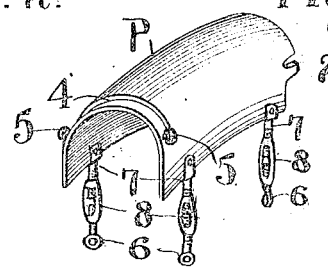

In the accompanying drawings, Figure 1 is a side elevation of a portion of a complete vehicle wheel equipped with my improved armor plates, and Fig. 2 is a cross section thereof. Fig. 3 shows one of the several plates and the fastenings therefor in perspective.

The armor as shown is constructed or built up with a series of plates P adapted to encircle the rubber tire T and cover the same both about its periphery and sides relatively as shown in Fig. 2. To this end, the said plates are approximately U shape in cross section and made to conform to the size of the tire whether it be a bicycle or an automobile tire and arranged to overlap or lap one over the other at their ends relatively as shown. For these purposes one of the said plates is recessed at its edges and ends as indicated at —2—, Fig. 3, and the other end is slightly depressed at its periphery as indicated at 4 and one plate is made to match the other at opposite ends and all are built alike in these particulars, so that it is immaterial what position a given plate may occupy in the series. Then as an auxiliary means for confining the meeting ends of the plates, I provide each plate with headed projections 5, the outer headed end of which laps over upon the end of the next plate, thus serving to confine said ends relatively and preventing the plates from getting separated at their joints. Then, having the plates thus constructed, I bind them firmly upon the tire by means of a chain C at each side of the wheel arranged upon the radius substantially of the inner portion of felly R, so that as to the periphery of the wheel the chains C occupy a considerably narrower circle. Each plate P is adjustably secured to the said chains C on each side of the wheel by means of screw or threaded stems 6 and 7, respectively, and turn buckle 8 uniting said stems, whereby when the turn buckles are rotated for tightening the stems 6 and 7 are drawn toward each other, and when rotated in the opposite direction the stems are separated and the parts loosened. Each stem 6 has an eye engaged in chains C and each stem 7 is pivotally engaged with plate P.

By this construction each armor plate has a separate adjustment at each end and is adjustable independently of all the others, but through the chains all the plates are connected and the tension is distributed through any adjustments that are made upon any given plate.

What I claim is:—

An armor for rubber tires consisting of a series of overlapping plates substantially U shape in cross section, and each plate having a transverse depression 4 at one end and outward projections 5 at the ends of said depressions and open slots in the other end lengthwise of the plate engaged by the said projections on the adjacent plate, in combination with a wheel and tire and means to secure the armor on the tire.

In testimony whereof I sign this specification in the presence of two witnesses.

VENDEL LÁSZLLÓ BÉKEFI.

Witnesses:
 E. M. FISHER,
 R. B. MOSER.